United States Patent [19]
Djukastein et al.

[11] Patent Number: 5,878,956
[45] Date of Patent: Mar. 9, 1999

[54] WATER CONSERVING SPRINKLER UNIT

[75] Inventors: Erik Djukastein, Sidney; Barry A. Burman; Carol Burman, both of Victoria, all of Canada

[73] Assignees: Contech Electronics, Inc.; Burman & Burman Corp., both of British Columbia, Canada

[21] Appl. No.: 855,795

[22] Filed: May 12, 1997

[51] Int. Cl.⁶ .................................................. A01K 15/00
[52] U.S. Cl. .......................... 239/69; 446/175; 340/573
[58] Field of Search ................................. 446/175, 415, 446/463; 239/67, 1, 69; 4/623; 119/712, 713, 27, 29; 340/573

[56] References Cited

U.S. PATENT DOCUMENTS

| | | | |
|---|---|---|---|
| 2,241,092 | 5/1941 | Jurgilanis | 239/211 X |
| 3,396,277 | 8/1968 | de la Chevreliere . | |
| 3,944,138 | 3/1976 | Easton | 239/211 X |
| 4,883,749 | 11/1989 | Roberts et al. | 4/623 |
| 4,996,521 | 2/1991 | Hollow . | |
| 5,009,192 | 4/1991 | Burman . | |
| 5,011,161 | 4/1991 | Galphin . | |
| 5,158,212 | 10/1992 | Sirhan | 446/175 X |
| 5,322,717 | 6/1994 | Killian | 239/69 X |
| 5,329,949 | 7/1994 | Moncourtois et al. . | |
| 5,458,093 | 10/1995 | MacMillan . | |
| 5,501,179 | 3/1996 | Cory . | |

FOREIGN PATENT DOCUMENTS

| | | |
|---|---|---|
| 1081951 | 7/1980 | Canada . |
| 2034112 | 7/1992 | Canada . |
| 2045373 | 12/1992 | Canada . |
| 2049073 | 2/1993 | Canada . |

*Primary Examiner*—Kevin Weldon
*Attorney, Agent, or Firm*—Jones, Day, Reavis & Pogue

[57] ABSTRACT

There is provided a new and useful water sprinkler unit for use as a toy in connection with a water source in which the unit is constructed so as to be within a single housing. The unit comprises a water inlet, a water sprinkler head and a fluid conduit between the water inlet and the water sprinkler head. There is also provided a power supply, motion-detection apparatus with up to 360 degrees visibility and a valve between the water inlet and the water sprinkler head. Circuits are provided to control the valve wherein the circuits open the valve for a pre-determined or variable period of time in response to movement detected by the motion-detection apparatus.

11 Claims, 2 Drawing Sheets

WATER CONSERVING SPRINKLER UNIT

FIELD OF THE INVENTION

This invention relates to a motion-activated water conserving sprinkler unit for use as a toy in connection with a water source.

BACKGROUND OF THE INVENTION

Children frequently enjoy playing in water sprinklers, particularly on hot and humid summer days. However, it is now known that water is not an ever-lasting resource and as such, homeowners are often advised by their municipalities to conserve water when watering their lawns for example. In addition, people are often advised to restrict their unnecessary use of water during particularly hot and humid period when the demands on the local water system are greatest.

To reconcile these two competing interests, namely the desire of kids to play in the water and the need to conserve water, a sprinkler system or unit which can be used as a toy but still conserves water is required and desired. A unit which limits the spray of water on an "as-needed" basis is one such unit. As a toy, therefore, such a unit would be one in which a spray is created whenever children are present or using the sprinkler, but in which the spray is turned off automatically when the children get tired or stop playing in the area. Similarly, a unit which limits the duration of the spray would also be advantageous as both a toy and a water conservation tool.

To be further profitable as a toy, the unit should be one in which all of the parts are housed in a single shell or case such that it can be simply hooked up to a hose and put in use. Also, a unit which offers a variety of spray options would be commercially useful and valuable.

Motion detection water systems have been used in the past, primarily as animal deterrents. In those systems known to the applicant, the motion detector covers a fixed area of the garden and activates a valve upon sensing the motion of an animal in that area. The valve opens and water is sprayed on the animal, or in the general vicinity of the movement to, hopefully, scare away the animal. Such systems are typically comprised of several discreet components which must each be placed in the proper position and are also typically meant to be more of a permanent or long-term addition to a garden. Reference is made for example to U.S. Pat. No. 5,458,093 of MacMillan, which issued Oct. 17, 1995 and U.S. Pat. No. 5,009,192 of Burman, which issued Apr. 23, 1991. However, neither of these systems would be suitable for use as a child's toy and neither are housed within a single shell or case for ease of use.

SUMMARY OF THE INVENTION

It is therefore an object of the present invention to provide a motion-activated water conserving sprinkler unit for use as a toy in connection with a water source.

In one aspect of the invention, there is provided a water sprinkler unit for use as a toy in connection with a water source in which the unit is constructed so as to comprise a housing. The unit comprises a water inlet and a water sprinkler head incorporated in the housing and a fluid conduit within the housing between the water inlet and the water sprinkler head. There is also provided power supply means within the housing, motion-detection means having up to 360 degrees visibility incorporated in the housing and valve means within the housing between the water inlet and the water sprinkler head. Circuit means are provided within the housing associated with said power supply means and said motion detection means and arranged so as to control the valve means wherein the circuit means opens the valve means for a pre-determined or variable period of time in response to movement detected by the motion-detection means.

In another aspect of the invention, the water sprinkler unit further comprises switch means within the housing in co-operation with the circuit means to selectively actuate a series of auditory signals wherein the circuit means is programmed so as to activate and deactivate the motion-detection means in response to the auditory signals.

In another aspect of the invention, the circuit means is programmed so as to deactivate the motion-detection means in response to a first series of auditory signals and activate the motion-detection means for a pre-determined or variable period of time in response to a second series of auditory signals.

In a preferred embodiment of the invention, the motion-detection means is a 360 degree infrared sensor.

BRIEF DESCRIPTION OF THE DRAWINGS

These and other advantages of the invention will become apparent upon reading the following detailed description and upon referring to the drawings in which.

Figure 1:
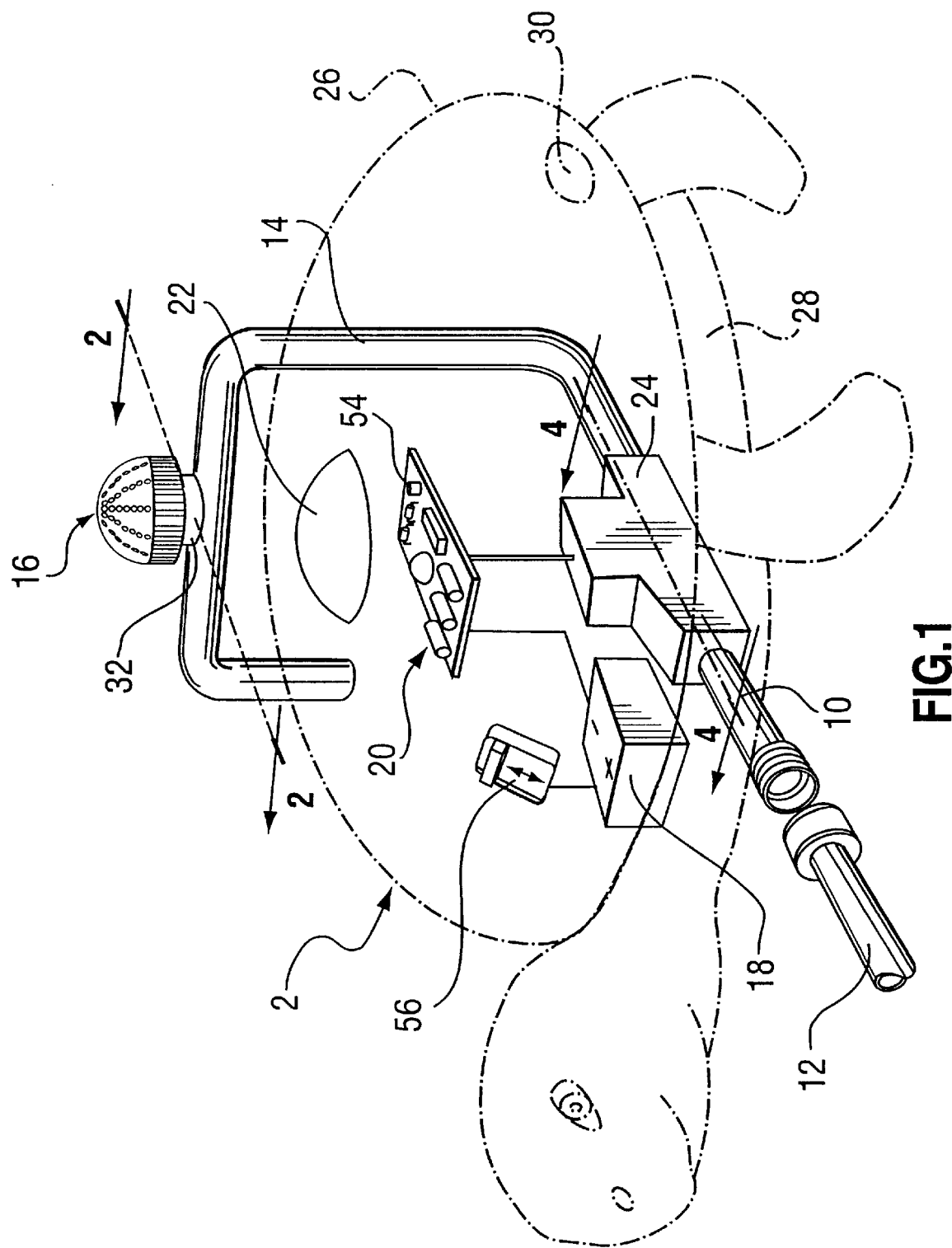
FIG. 1 is a perspective view of the present invention, shown partially in exploded view.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

Turning to the drawings, FIG. 1 illustrates a water sprinkler unit 2 for use as a toy, for example, in connection with a water source (not shown).

The water sprinkler unit 2 comprises a water inlet 10 adapted to be connected to a water outlet 12 of the water source. The water inlet 10 is attached to, or integral with, a fluid conduit 14 which fluidly connects the water inlet 10 to a water outlet, typically in the form of a water sprinkler head 16. The fluid conduit 14 can be rigid plastic pipe, or any other suitable material of pipe that is sufficiently durable to withstand repeated use, yet is light enough so that the entire unit 2 remains portable.

As part of the unit 2 there is also provided a power supply 18, illustrated in FIG. 1 as a battery. However, it would also be possible to design the unit with a connection to an AC power source, so that the entire unit could run off of household power.

In line with the power supply 18, there is a circuit 20 designed to control a motion detection means 22 and a valve means 24. As illustrated in FIG. 1, the motion detection means 22 is an infrared sensor with 360 degrees visibility.

Other degrees of motion detectors may be used in the unit 2, however, it is preferable that the motion detector used have the 360 degrees of visibility.

The circuit 20 is programmed to control the valve 24 such that the valve 24 is opened for a pre-determined period of time in response to a signal received from the motion detector 22, which signal corresponds to movement detected by the motion detector 22.

The entire unit 2 is intended to be constructed so as to be in combination within a single housing or shell 26, with the water inlet 10 and the sprinkler head 16 accessible from outside the housing 26. Similarly, the housing 26 is constructed of a material or in a manner such that it does not impede the vision of the motion detector 22, nor its range of vision. As illustrated in FIG. 1, the housing or shell 26 can be in various forms, here illustrated as a turtle, thus increasing the value of the unit 2 as a toy. It is also contemplated that the housing or shell 26 have a weighted base portion 28 for stability. Thus, the base portion 28 of the housing 26 can be constructed so as to be permanently weighted, or there can be provided an access means, illustrated as a plug 30, by which the base portion 28 of the shell 26 can be filled with water, sand or another similar weighting medium, in order to weigh down the unit 2.

Figure 2:
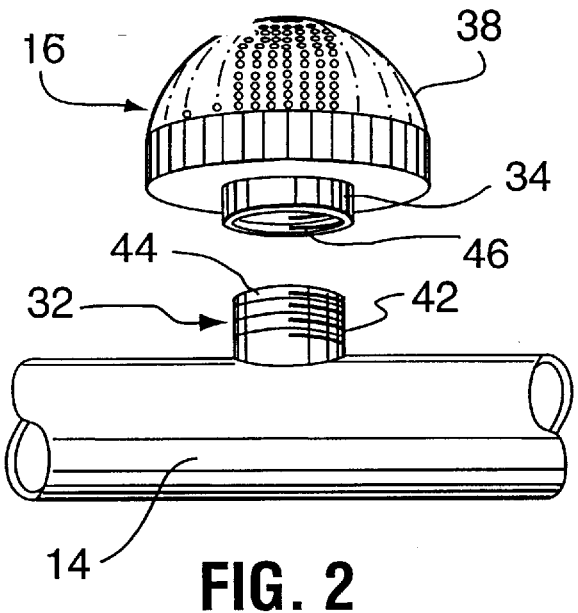
FIG. 2 is a cross-section taken along line 2—2 of FIG. 1.
Figure 3:
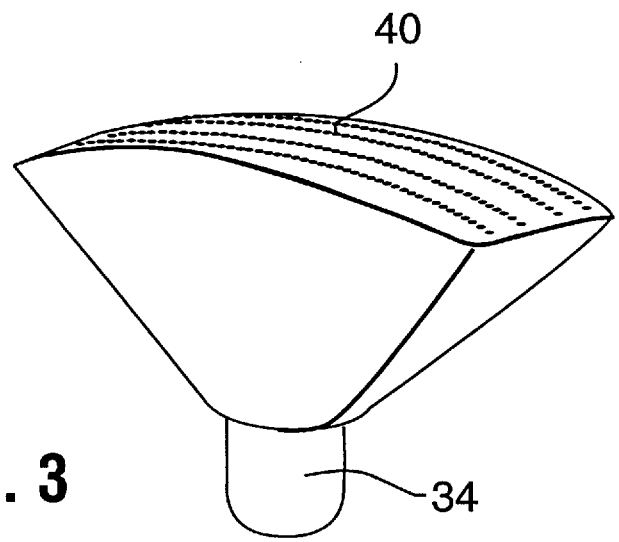
FIG. 3 is an alternate view of the segment of the invention depicted in FIG. 2.

The unit 2 can be designed with a variety of sprinkler heads 16, again primarily to increase its value as a toy. With reference to FIGS. 2 and 3, there is shown an attachment means 32 on the fluid conduit 14 intended to mate with a co-operating attachment means 34 on the sprinkler head 16. In this manner, the unit 2 is equipped with a variety of interchangeable sprinkler heads, in the form of a gentle spray head 38 or a fan spray head 40, for example.

As illustrated in FIG. 2, the attachment means 32 may comprise an upstanding portion of conduit 42 having a threaded portion 44 at its top. In this configuration, the co-operating attachment means 34 on the sprinkler heads has a mating threaded aperture 46 into which the threaded portion 44 is received. Thus, the sprinkler heads are easily interchangeable by simply unscrewing from the attachment means 32, the head which is present and attaching a different head. Other embodiments of releasable attachment means (not shown) could be used in place of mating threaded members and would still fulfil the objects of the invention. For example, the attachment means 32 could be in the form of flanged or spring loaded member upstanding from the fluid conduit 14, which member co-operates with a recessed aperture in the sprinkler heads for a quick press fit and release.

Figure 4:
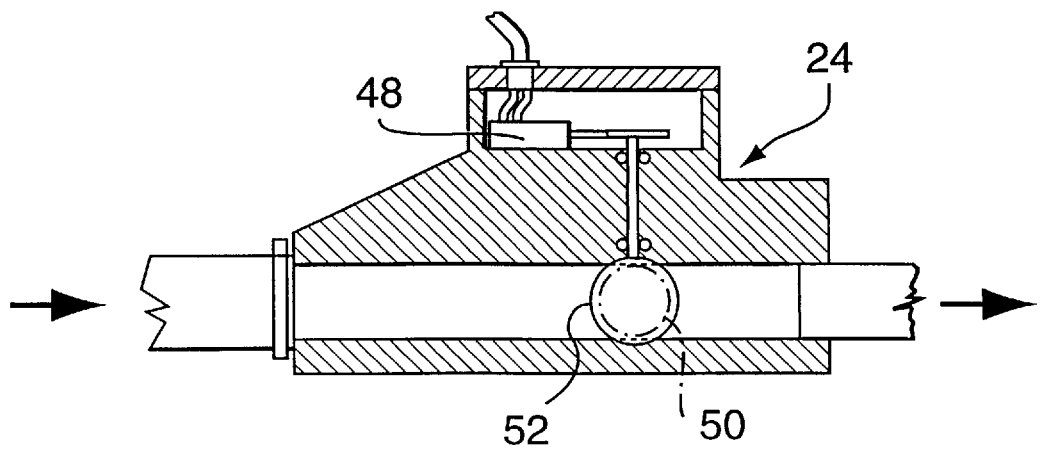
FIG. 4 is a cross-section taken along line 4—4 of FIG. 1.

With reference to FIG. 4, the valve 24 is shown as an electronically actuated solenoid 48 which moves between the closed position 50 and the open position 52 in response to movement detected by the motion detector 22 as explained above. However, any electronically actuated valve could be sufficient for the purposes of the present invention and it is contemplated that several commercially available valves could be used.

The circuit 20 can be programmed to maintain valve 24 in the open position 50 for a pre-determined period of time. However, the unit 2 may further comprise a dwell time means 54 to adjust the period of time for which the valve 24 is in the open position 52 in response to the signal from the circuit 20. Such dwell time means 54 may be in the form of an adjustable electronic pot, or some other similar electronic device which adjusts the length of the signal being sent from the circuit 20 to the valve 24 in response to movement detected by the motion detector 22. Thus, the duration of the spray from the sprinkler head 16 can be shortened or lengthened as desired by the user.

In another embodiment of the invention, the unit 2 may incorporate a switch 56 which functions in co-operation with the circuit 20 to turn the unit on and off and to selectively actuate a series of auditory signals. The circuit 20 thus be programmed to de-activate the motion detector 22 in response to a first series of auditory signals and activate the motion detector 22 once those signals cease. The unit 2 is thus provided with another aspect as a game in auditory signal mode, which will be described below.

In use, the unit 2 can be easily moved to a desired location on the lawn or within a yard and does not require any special equipment, other than proximity to a water source. It is not required that the unit 2 be affixed to or implanted in the ground, so if the children playing with it at the time would like to move it, they may easily do so.

The unit is turned on in either regular mode or in the auditory signal mode or a combination of both. In regular mode, the motion detector 22 is operable whenever a child comes within its range, it sends a signal to the circuit 20 which in turn opens the valve 24 thereby spraying water on whomever is within range of the sprinkler head 16. Depending on the age of the children playing, or the other intended use of the unit 2 (such as use as an animal deterrent), the most appropriate sprinkler head may be chosen and installed on the unit 2. Once the valve 24 has been opened, it will remain in the open position 52 for the pre-determined, or a variable, period of time during which the children playing can move about freely. After that, the unit 2 resets and any movement within the range of the motion detector 22 will once again turn on the water.

In the auditory signal mode, the unit 2 generates a series of auditory signals during which the motion detector 22 is deactivated and players are free to move about. However, when those signals stop, the motion detector 22 would be activated and would instantly check to see if any one was still moving. If so, the valve 24 would be opened and the unit 2 would spray all the players within range of the sprinkler head 16 for the pre-determined time.

In an alternate embodiment, the unit 2 may be programmed to generate two series of signals. For example, the first series of signals could be a string of the word "go" (go,go,go,go) while the second series could be a word like "stop" (stop). Thus, on "go", the motion detector 22 is deactivated and players are free to move about. However, on sounding the word stop, the motion detector 22 would be activated and would instantly check to see if any one was still moving. If so, the valve 24 would be opened as before.

While the unit 2 has been described for use primarily as a toy, it is possible to use it for other applications. For example, the unit 2 could be used as an animal deterrent such that it could be left on, in regular mode, in a yard and would spray any animal coming into the yard within the range of the motion detector 22. In a similar manner, the unit 2 could be effective as a harmless deterrent to discourage humans trespassing over private property.

Thus, it is apparent that there has been provided in accordance with the invention a motion-activated water conserving sprinkler unit for use as a toy in connection with a water source that fully satisfies the objects, aims and advantages set forth above. While the invention has been described in conjunction with illustrated embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What is claimed is:

1. A water sprinkler unit for use as a toy in connection with a water source, said unit comprising:

a housing;

a water inlet incorporated with said housing;

a water sprinkler head incorporated with said housing;

a fluid conduit within said housing between said water inlet and said water sprinkler head;

power supply means within said housing;

motion-detection means having up to 360 degrees visibility incorporated with said housing;

valve means within said housing between said water inlet and said sprinkler head;

circuit means within said housing associated with said power supply means and said motion-detection means and arranged so as to control said valve means wherein said circuit means opens said valve means for a period of time determined by a user of said unit; and switch means within said housing in cooperation with said circuit means, and said circuit means being programmed to selectively actuate a series of auditory signals to control said valve means and to activate and deactivate said motion-detection means, said valve means opened in response to movement detected by said motion-detection means when activated.

2. The unit of claim 1 wherein said motion-detection means is an infrared sensor.

3. The unit of claim 1 wherein said fluid conduit further comprises attachment means to releasably receive one of a plurality of interchangeable water sprinkler heads which comprise co-operating attachment means.

4. The unit of claim 1 further comprising dwell time means attached to said circuit means to adjust said pre-determined period of time for which said valve means is open in response to movement detected by said motion-detection means.

5. The unit of claim 1 wherein said circuit means is programmed so as to deactivate said motion-detection means in response to a first series of auditory signals and activate said motion-detection means for a pre-determined or random period of time in response to a second series of auditory signals.

6. The unit of claim 1 wherein said housing is in the form of a shell having a weighted base portion.

7. The unit of claim 1 wherein said housing is in the form of a shell having a base portion and means to access said base portion to fill said base portion with a weighting medium.

8. The unit of claim 1 wherein said valve means is electronically activated in response to signals received from said motion-detection means.

9. The unit of claim 1 wherein said water inlet is constructed so as to be releasably attachable to said water source.

10. The unit of claim 1 further comprising switch means to turn the unit on and off or to alternate the unit between modes of use.

11. A method of using a motion activated water sprinkler unit as a toy, said unit comprising a housing, a water inlet within said housing, a water sprinkler head attached to said housing, a fluid conduit within said housing between said water inlet and said water sprinkler head, a power supply means within said housing, motion detector means having up to 360 degrees visibility incorporated with said housing, valve means within said housing between said water inlet and said water sprinkler head and circuit means within said housing associated with said power supply means and said motion detection means and arranged so as to control said valve means, wherein said method comprises the steps of selectively actuating a series of auditory signals, deactivating said motion-detection means in response to a first series of said auditory signals thereby permitting movement about said unit and activating said motion-detection means in response to a second series of auditory signals and opening said valve means for a period of time as determined by a user in response to movement detected by said motion-detection means thereby spraying people within range of said sprinkler head.

* * * * *